United States Patent [19]

Kuhlmann

[11] 3,907,881
[45] Sept. 23, 1975

[54] QUALITY OF PHTHALIC ACIDS IMPROVED BY OXIDIZABLE ORGANIC ACIDS

[75] Inventor: George E. Kuhlmann, Downers Grove, Ill.

[73] Assignee: Standard Oil Company, Chicago, Ill.

[22] Filed: Dec. 20, 1972

[21] Appl. No.: 316,862

[52] U.S. Cl............................................. 260/524 R
[51] Int. Cl.² .................... C07C 51/33; C07C 63/26
[58] Field of Search ................................. 260/524 R

[56] References Cited
UNITED STATES PATENTS

| | | | |
|---|---|---|---|
| 2,833,816 | 5/1958 | Saffer et al. | 260/524 R |
| 3,064,044 | 11/1962 | Baldwin | 260/524 R |
| 3,505,397 | 4/1970 | Littleton et al. | 260/524 R |
| 3,678,105 | 7/1972 | Croce et al. | 260/524 R |

Primary Examiner—Robert Gerstl
Assistant Examiner—Richard D. Kelly
Attorney, Agent, or Firm—Fred R. Ahlers; Arthur G. Gilkes; William T. McClain

[57] ABSTRACT

Phthalic acids of improved quality are obtained direct from oxidation of xylenes with molecular oxygen in oxidation zone having co-oxidizable organic acid present in addition to a liquid phase acetic acid solution of one or more heavy metal oxidation catalyst and bromine releasing bromide compound. Particularly useful co-oxidizable organic acids are those which co-oxidize with the xylene to reactive primary radicals, such as sebacic, stearic or phenylacetic acids. Such quality improvement is manifested by decreased aldehydic acid and toluic acid impurity contaminants in recovered phthalic acid.

4 Claims, No Drawings

QUALITY OF PHTHALIC ACIDS IMPROVED BY OXIDIZABLE ORGANIC ACIDS

BACKGROUND OF INVENTION

The discovery of the unique catalysis afforded by the acetic acid solution of the joint use of one or more heavy metal oxidation catalysts and a source of bromide ion for the liquid phase oxidation at a temperature from 50° to 275°C. of aliphatic-substituted aromatic compounds with molecular oxygen to aromatic polycarboxylic acid products was first disclosed in U.S. Pat. No. 2,833,816 which issued May 6, 1958. The use of said unique catalysis for such oxidation of xylenes under liquid phase conditions at 50° to 275°C. made feasible for the first time large scale commercial catalytic liquid phase production of the phthalic acids. Since 1958 many improved modes of conduct of such oxidations using the unique combination of heavy metal and bromide ion have been disclosed as advancements of that art. Some improvements were directed to yield improvement per unit of time and other improvements were directed to improve quality and yield of phthalic acid products. In general the improved modes of conduct for said liquid phase oxidation using the unique catalysis involved use of either constant temperature or constant pressure; scheduling different rates of oxygen supply; use of sources of oxygen having oxygen contents below and above the oxygen content of air; regulation of water content of acetic acid solvent in the oxidation zone; sequentially staging of two or series connected oxidation zones operated at different temperatures, pressures, oxygen concentration or water concentration; use of different combinations of heavy metals and types of bromide iron source, e.g. ionic and combined bromine; and combinations thereof as applied to batchwise, semi-continuous and continuous operations. Such improved modes of operation using the unique catalysis did provide for increase of phthalic acid products from the yields demonstrated by the methods of U.S. Pat. No. 2,833,816. For example the yields of iso- and terephthalic acids from the corresponding isomeric xylenes were increased to 90–92 mole percent from 75–80 mole percent demonstrated by said patent with attendant improved decrease of partially oxidized xylene to such intermediates as aldehydo-benzoic acid and toluic acid which contaminated said phthalic acid products.

Commercially feasible methods were devised for purifying the phthalic acid products from such improved modes of conduct of the aforementioned liquid phase oxidation using the unique catalysis. Such purifications were directed either to obtension of substantially colorless products for use in unsaturated polyesters or to obtension of terephthalic acid product of a purity of at least 99.9 weight percent for direct reaction with a diol for the preparation of macropolyesters of the high molecular weight required for film and fiber manufacture. However, little attention was given since 1958 to the introduction of a new component into the unique catalytic liquid phase oxidation to decrease partially oxidized xylene contaminants of phthalic acid products recovered from said oxidations.

It has been known since 1958 that oxidation of the isomeric xylenes in the presence of the unique catalysis at temperatures in the range of 50° to 120°C. using oxygen gas as oxidant produced the respective phthalic acid product containing relatively large amounts, 3 to 10 weight percent, of formylbenzoic acid and like amounts of toluic acids. Oxidations under liquid phase conditions in the presence of the unique catalysis at temperatures above 120°C., i.e. in the range of 120° to 275°C., using oxygen gas or air as source of molecular oxygen did decrease the contaminating formylbenzoic and toluic acids in phthalic acid products from the corresponding xylenes to below 3 weight percent, e.g. 0.5–2.0 weight percent. The improved modes of conduct of the catalytic liquid phase oxidation did little to improve the low temperature (i.e. 50°–100°C.) oxidations but did increase phthalic acid product yields for the higher temperature oxidations.

To make more effective, on a pounds per hour throughput basis, the various commercially available purification routes for phthalic acid products it is highly desirable to obtain such phthalic acid products direct from oxidation of xylenes in a higher quality by some means in addition to such improved modes of conduct of liquid phase oxidation using the unique catalysis.

SUMMARY OF INVENTION

Phthalic acids are obtained in higher quality by the oxidation of xylenes with molecular oxygen at a temperature in the range of 50° to 275°C. in an oxidation zone containing an organic acid co-oxidizable to reactive primary radicals in addition to the liquid phase acetic acid solution of heavy metal oxidation catalyst and bromine providing the unique catalysis. The co-oxidizable organic acid so used decreases by 15–30% the amount of formylbenzoic contaminant of the desired phthalic acid product and act as activators of the unique catalysis. The co-oxidizable organic acids are used in amounts within the range of 2 to 10 moles per gram atom of catalyst metal. Typical of such co-oxidizable organic acids are sebacic, stearic and phenylacetic acids. Co-oxidizable organic acids which upon oxidation yield tertiary radicals, such as trimethyl acetic acid, enhance the formation of formylbenzoic acid contaminant. In addition to reducing formylbenzoic acid contaminant level, the primary radical-producing co-oxidizable organic acids leave no residue to contaminate either the phthalic acid product or the acetic acid solvent. Such co-oxidizable organic acids useful, as above mentioned, in the range of 2–10 moles per gram atom of catalyst metal can be added either with the xylene or preferably with the acetic acid.

The amount of acetic acid used in the catalytic liquid phase oxidation can vary from 2 to 20 weight parts per weight part of the xylene. For low temperature oxidation, 50° to 120°C. and atmospheric to 50 p.s.i.g. pressure the unique catalysis is provided by acetic acid solutions containing cobalt or cobalt and manganese at 13 to 112 weight percent (calculated as the metals and not their salts) and 16–116 weight percent of bromine based on aromatic compound to be oxidized. For the higher temperature, 120° to 275°C., there can be used cobalt, manganese mixtures of cobalt and manganese or cobalt, manganese and cerium among the useful heavy metals hereafter defined in total metal concentrations (as distinguished from their salts) of 0.01 to 1.0 weight percent and bromine concentrations of 0.01 to 1.0 weight percent based on the aromatic compound. Bromine can be provided by elemental bromine, ionic bromides such as hydrogen bromide, sodium bromide or ammonium bromide or by co-valent bromine-containing compounds which do not ionize to bromide ion such as potassium bromate, tetrabromoethane, benzylbromide, bromobenzene or bromoacetic acid but which provide brimide ion at the temperature at which the oxidation is conducted. Mixtures of ionic and co-valent bromine compounds, as is known, can be advantageously used as source of bromine for the oxidation. For the higher temperature oxidation heavy metals having an atomic weight between about 50 and about 200 other than cobalt, manganese and cerium or in addition thereto can be used.

The minimum pressure used in the oxidation zone is that pressure which will provide acetic acid in the liquid phase at temperatures of 50° to 275°C. The source of molecular oxygen oxidant can be any gas-containing molecular oxygen in concentrations from 10 to 100 volume percent. For the low temperature (50°–120°C.) oxidation the source of molecular oxygen can be oxygen gas or mixtures thereof with air or inert gas (e.g. nitrogen or $CO_2$) containing at least 50 volume percent oxygen. But for the higher temperature oxidation (120°–275°C.) the source of molecular oxygen can contain not more than 50 volume percent oxygen as in air or mixtures of oxygen gas with air or inert gas to provide controllable oxidation, which is exothermic, at such higher temperatures.

The catalytic liquid phase oxidations for which this invention provides the aforementioned beneficial improvements have their most practicable application under the following temperature conditions. The low temperature (50°–120°C.) oxidation using high cobalt or cobalt and manganese to xylene and acetic acid ratios to provide most feasible production of phthalic acids especially terephthalic acid from p-xylene, per unit of time when conducted using oxygen gas, temperatures of 110° to 120°C. at pressures of 40 to 60 p.s.i.g. even though liquid phase conditions in the oxidation zone can be maintained at pressures of 0 (atmospheric pressure) to 5 p.s.i.g. Such 110° to 120°C. oxidations of p-xylene in the absence of haloacetic acid provide terephthalic acid product recovered direct (e.g. by filtration) from fluid oxidation effluent in 80–92 mole percent yields in 80–120 minute residence periods but contaminated with 5.4 to 1.3 weight percent p-formylbenzoic acid and 0.6 to 0.4 weight percent p-toluic acid. The higher temperature (120°–275° C.) oxidation using both lower acetic acid and heavy metal (Co, Mn and/or Ce) ratios to xylenes provide most feasible production of phthalic acids, especially terephthalic acid from p-xylene, per unit of time when conducted at temperatures in the range of 175° to 250°C. and oxidation zone pressures of 150 to 400 p.s.i.g. Such oxidations of p-xylene at 200°–210°C. and pressure of 180–210 p.s.i.g. in the absence of primary radical-producing co-oxidizable organic acid provide terephthalic acid product recovered direct from fluid oxidation effluent in 90–92 mole percent yields contaminated with but 0.5 to 0.8 weight percent p-formylbenzoic acid and 0.2 to 0.4 weight percent p-toluic acid in 40 to 60 minute residence periods.

However, by the use of primary radical-producing co-oxidizable organic acid in the above oxidations of p-xylene the amount of contaminant p-formylbenzoic and p-toluic acids in terephthalic acid recovered direct from fluid oxidation effluent are each decreased by from 15 to 30%.

The following illustrative examples are provided to enable one skilled in this art to understand and practice the present invention.

The illustrative example demonstrate the beneficial improvements afforded by the use of three typical primary radical-producing co-oxidizable organic acids in the oxidation of p-xylene with air to terephthalic acid. These p-xylene oxidations are made with air at the oxidation zone pressure of 250 p.s.i.g. and indicated temperature and added co-oxidizable organic acid. The reactants and catalyst are:

| | |
|---|---|
| 100% Acetic Acid | 1313 Grams |
| Water | 50 Grams |
| p-Xylene | 348 Grams |
| Total Co and Mn metals | 0.10 Weight % on Acetic Acid |
| Bromine | 0.05 Weight % on Acetic Acid |

The oxidation reactions are conducted in an oxidation vessel having a valved air inlet at the bottom; a valved dip-leg p-xylene inlet; a heating mantle, a water cooled reflux condenser with a pressure regulating valve in its gas discharge line; a gas-vapor transfer line connecting the vapor space of said otherwise sealed vessel with said condenser; and a gas sampling top line which has a dry ice (solid $CO_2$) cooled trap and an oxygen analyzer in said gas discharge line beyond the pressure reducing valve and condenser. To such oxidation vessel there is charged the acetic acid having dissolved therein the water and sources of cobalt, manganese and bromine. The pressure regulating valve is set at operating pressure and oxidation vessel is pressured to said pressure with nitrogen gas. The acetic acid solution is heated to oxidation temperature which causes substantially all the nitrogen gas to be discharged from the system. Thereafter the 348 grams of p-xylene is pumped and air injected simultaneously into the hot acetic acid solution at correlated rates to provide, on acetic acid free basis, a small amount (1 to 5 volume percent) of oxygen in the condenser discharge gas. After all the xylene has been pumped in, air injection alone is continued for at least about 5 to 10 minutes (difference between "run time" and "pump time") until the oxygen content of the condenser discharge gas is 20 percent by volume. The reaction vessel contents are discharged with the aid of nitrogen gas, cooled to about 50°C. and charged to a filter to recover terephthalic acid containing product. Additional solids added to the filter cake were obtained by rinsing the reactor. Thus the total recovered solids are the product. Such product, after being washed with warm acetic acid and dried, is analyzed for p-formylbenzoic acid (4-CBA) and p-toluic acid contents. The foregoing oxidation is a semi-continuous process, one of the improved methods of conduct of the aforementioned unique catalytic liquid phase oxidation methods. The conditions and results of three such oxidations each using a different co-oxidizable organic acid, one using trimethylacetic acid co-oxidizable to tertiary radicals and two such oxidations for comparative purposes using no co-oxidizable organic acid are listed in TABLE I. As used in that table, "TMAA" is trimethylacetic acid, "SA" is sebacic acid, "STA" is stearic acid, "Nap" is naphthalene, and "PAA" is phenylacetic acid.

TABLE I

EFFECT OF CO-OXIDIZABLE ORGANIC ACID ON p-XYLENE OXIDATION

| Example No. | Comparative | | | Illustrative | | |
|---|---|---|---|---|---|---|
| | I | II | III | 1 | 2 | 3 |
| Organic Acid Added | None | TMAA | Nap. | Nap STA | SA | PAA |
| Mole:gram atom metal | 0 | 10:1 | 2:0:1 | 2:2:1 | 5:1 | 10:1 |
| Temperature °F. | | | | | | |
| Initial | 380 | 381 | 391 | 380 | 380 | 380 |
| Maximum | 424 | 429 | 427 | 426 | 428 | 431 |
| Average | 420 | 425 | 425 | 420 | 425 | 430 |
| Run Time, minutes | 82 | 82 | 88 | 82 | 84 | 78 |
| Pump Time, minutes | 63 | 63 | 63 | 63 | 63 | 63 |
| Filter Cake product %* | 105 | 123 | 126 | 109 | 116 | 113 |
| 4-CBA % | 0.81 | 0.84 | 1.01 | 0.68 | 0.62 | 0.58 |
| p-Toluic Acid % | 0.23 | 0.24 | 0.32 | 0.18 | 0.23 | 0.15 |
| Terephthalic Acid % | 98.8 | 98.3 | 98.5 | 99.1 | 98.9 | 98.9 |

*Based on 348 p-xylene charge.

Dry Product from Comparative Examples II and III had less than 10 ppm of naphthoics. The soluble filtrate solids from Examples 2 and 3 had, respectively, 3500 ppm sebacic acid and less than 10 ppm phenylacetic acid. The Product from Example 1 had 80 ppm naphthoics. Naphthalene (2 moles per gram atom catalyst metal) was used with stearic acid to trap by in situ alkylation, if any, long-lived primary radicals but analysis of Product did not detect any such alkylation products or significant oxidized products thereof. The oxidation with added naphthalene (Comparative III), but no co-oxidizable organic acid, was conducted so that effect of naphthalene when used with stearic acid (Illustrative Example 1) could be ascertained.

The use of the three co-oxidizable, primary radical-producing organic acids in the oxidation of o-xylene or m-xylene can be expected to give results comparable to that shown in TABLE I.

From the oxidations such as illustrative of this invention, it is concluded that the use of primary radical-producing co-oxidizable organic acids in general, and the three illustrated in particular, when used in the ratio of 2–10 moles per gram atom of catalyst metal in the oxidation of xylenes, especially p-xylene, at a temperature in the range of 380°–425°F. but at pressures of 300–400 p.s.i.g. in the oxidation zone (therefore higher oxygen concentrations), in semi-continuous or continuous oxidation processes can effect decrease of formylbenzoic acid and toluic acid contaminants in phthalic acid products by 16 to 30% from the 0.5 to 1.0% level in phthalic acid products produced in the absence of such co-oxidizable organic acids and produce equivalent phthalic acid yield above 90–92 mole percent.

The invention claimed is:

1. A method of improving quality of phthalic acid produced by air oxidation of a xylene in the presence of a liquid phase of acetic acid solution of heavy metal oxidation catalyst and bromine which method consists essentially of conducting such oxidation in the presence of primary radical-producing, non-residue forming co-oxidizable organic acid used in an amount in the range of 2–10 moles per gram atom of catalyst metal.

2. The method of claim 1 wherein said co-oxidizable organic acid is sebacic acid and the xylene is p-xylene.

3. The method of claim 1 wherein the co-oxidizable organic acid is stearic acid and the xylene is p-xylene.

4. The method of claim 1 wherein the co-oxidizable organic acid is phenylacetic acid and the xylene is p-xylene.

* * * * *